United States Patent
Roman et al.

(10) Patent No.: US 12,277,478 B2
(45) Date of Patent: Apr. 15, 2025

(54) METHODS AND APPARATUSES FOR OPERATING A GAUSSIAN BOSON SAMPLING QUANTUM DEVICE AS AN ANNEALER

(71) Applicant: MULTIVERSE COMPUTING S.L., Donostia-San Sebastian (ES)

(72) Inventors: Orus Roman, Donostia-San Sebastian (ES); Mugel Samuel, Toronto (CA)

(73) Assignee: MULTIVERSE COMPUTING S.L., Donostia-San Sebastian (ES)

( * ) Notice: Subject to any disclaimer, the term of this patent is extended or adjusted under 35 U.S.C. 154(b) by 1107 days.

(21) Appl. No.: 17/140,745

(22) Filed: Jan. 4, 2021

(65) Prior Publication Data

US 2022/0172092 A1    Jun. 2, 2022

(30) Foreign Application Priority Data

Dec. 1, 2020  (EP) ...................................... 20383046

(51) Int. Cl.
  *G06N 10/00*  (2022.01)
  *G06F 17/18*  (2006.01)

(52) U.S. Cl.
  CPC .............. *G06N 10/00* (2019.01); *G06F 17/18* (2013.01)

(58) Field of Classification Search
  CPC .......... G06N 10/00; G06N 10/60; G06N 10/80
  See application file for complete search history.

(56) References Cited

U.S. PATENT DOCUMENTS

2022/0051124 A1*  2/2022  Bradler .................. G06N 10/00

FOREIGN PATENT DOCUMENTS

WO    2018/119522 A1    7/2018

OTHER PUBLICATIONS

Banchi, Leonardo, et al. "Molecular Docking with Gaussian Boson Sampling." arXiv preprint arXiv:1902.00462 (2019). (Year: 2019).*
Chancellor, Nicholas, Stefan Zohren, and Paul A. Warburton. "Circuit design for multi-body interactions in superconducting quantum annealing systems with applications to a scalable architecture." npj Quantum Information 3.1 (2017): 21. (Year: 2017).*
Bradler, Kamil, et al. "Gaussian boson sampling for perfect matchings of arbitrary graphs." Physical Review A 98.3 (2018): 032310. (Year: 2018).*
Yu, Shang, et al. "A universal programmable Gaussian Boson Sampler for drug discovery." Nature Computational Science 3.10 (2023): 839-848. (Year: 2023).*

(Continued)

*Primary Examiner* — Matthew D Sandifer
(74) *Attorney, Agent, or Firm* — Snell & Wilmer LLP (57) ABSTRACT

A computer-implemented method comprising: obtaining an equation with a cost function for minimization related to an optimization problem thereby yielding a cost function equation, the cost function including two or more binary variables, converting the cost function equation into a Boolean formula in Conjunctive Normal; obtaining a Max-Clique problem by processing the Boolean formula; providing the Max-Clique problem to a Gaussian Boson Sampling, GBS, quantum device; and processing light output data of the GBS quantum device so as to find values of the two or more binary variables of the cost function.

19 Claims, 2 Drawing Sheets

(56) References Cited

OTHER PUBLICATIONS

European Search Report and Written Opinion of the European Search Authority, EP20383046, dated May 31, 2021, 10 pages.
Thomas R Bromley et al., "Quantum Science and Technology Applications of near-term photonic quantum computers: software and algorithms", Quantum Sci. Technol., IOP Publishing, May 12, 2020, https://iopscience.iop.org/article/10.1088/2058-9565/ab8504/pdf.
Zhengbing Bian et al., "The Ising Model: Teaching and Old Problem New Tricks", Aug. 30, 2010, https://www.dwavesys.com/sites/default/files/weightedmaxsat_v2.pdf.
Vicky Choi, "Adiabatic Quantum Algorithms for the NP-Complete Maximum-Weight Independent Set, Exact Cover and 3SAT Problems", arxiv.org, Cornell University Library, Apr. 13, 2010.
Weng-Long Chang et al., "Quantum speed-up in solving the maximal clique problem", arxiv.org, Cornell University Library, Mar. 30, 2018.

\* cited by examiner

METHODS AND APPARATUSES FOR OPERATING A GAUSSIAN BOSON SAMPLING QUANTUM DEVICE AS AN ANNEALER

TECHNICAL FIELD

The present invention relates to the field of computing apparatuses. More particularly, the present invention relates to methods and apparatuses for operating a photonic quantum device as an annealer thereby optimizing a cost function of an optimization problem for the control or configuration of a process, device or system.

STATE OF THE ART

The appearance and continued development of quantum devices has opened the door to solving many computing problems that could not be solved up until then due to the complexity thereof, or at least not in acceptable timeframes, e.g. in less than a decade, a year, etc. An example of such computing problems are optimization problems like Quadratic Unconstrained Binary Optimization, whose minimization is NP-Hard.

Different types of quantum devices have been developed so far, each type featuring a particular technology with respective advantages and disadvantages. Quantum devices based on circuits having superconducting materials through which electric currents flow while the materials thereof are at a temperature in the order of tens or hundreds of millikelvin—have been gaining traction lately, and as a result there have been developments for operating devices of this type as annealers.

U.S. Ser. No. 10/691,771-B2 provides a method for generating an embedding pattern used for solving an Integer Linear Programming problem using a Physical Ising Machine. EP-3664099-A1 describes methods and systems for allocating items in an exchange system, which results in the definition of an exchange problem, using quantum computing resources. U.S. Pat. No. 9,152,746-B2 describes a quantum annealer simulator; with the simulator, a classical computer simulates the unitary dynamics of a quantum annealer for finding the solution to optimization problems.

Developments appear to be necessary to exploit the capabilities of other types of quantum devices, such as photonics quantum devices. This type of devices include circuits through which photons propagate; further, many photonics quantum devices can operate at ambient temperature. Gaussian Boson Sampling quantum devices could be used for the solving of optimization problems as well.

There is an interest in enabling the operation of photonics quantum devices as annealers because that would make them highly convenient for the control of processes, devices and systems in many applications.

DESCRIPTION OF THE INVENTION

A first aspect of the invention relates to a computer-implemented method comprising obtaining an equation with a cost function for minimization related to an optimization problem thereby yielding a cost function equation, the cost function including two or more binary variables; converting an integer programming formulation of the cost function equation into a Boolean formula in Conjunctive Normal Form namely CNF comprising a clause for each term of the cost function that includes at least one binary variable; obtaining a Max-Clique problem by processing the Boolean formula; providing the Max-Clique problem to a Gaussian Boson Sampling namely GBS quantum device; and processing light output data of the GBS quantum device after the step of providing the Max-Clique problem so as to find values of the two or more binary variables of the cost function.

The method makes possible to have an optimization problem solved using a GBS quantum device as a quantum optimization device or quantum annealer. To this end, a computing apparatus or system obtains the cost function equation and processes it so as to provide quantum state of light codifiable into the quantum device, and then processes the output of the quantum device to provide a solution to the optimization problem. The optimization problem preferably relates to the operation of devices and/or systems, and/or relates to processes themselves, e.g. how the different entities in a process interact. For example, the optimization problem may relate to an optimization problem for one of: control of a factory, control of a production line, control of a machine, training of a machine learning algorithm, factoring large numbers, control of logistics, control of scheduling, and routing, quality control of workpieces produced with a machine, traffic flow, etc.

The cost function equation is such that it defines an Unconstrained Binary Optimization—namely UBO—that, in some examples, sets out a Quadratic Unconstrained Binary Optimization namely QUBO whereas in other examples it sets out a Higher-order Unconstrained Binary Optimization—namely HUBO—. In this sense, the cost function includes a plurality of binary variables, which preferably can take values of 0 and 1—but could also take values of −1 and 1, for example—, that is converted into a CNF Boolean formula for the binary values. Accordingly, the solution that minimizes the cost equation can be found by finding the assignment—or assignments—that maximally satisfies the Boolean formula, that is an NP-Complete problem. The Boolean formula is, in turn, processed so as to obtain the Max-Clique problem, which is an NP-Hard problem that is to be provided to the quantum device for solving.

The computing apparatus or system processes the light output of the quantum device, which is transformed into data either by the computing apparatus or system itself—with a converter thereof—or by a converter not part of the apparatus or system—that is, for example, part of the quantum device itself—. With the data of the light output the Max-Clique problem is solved, thereby making possible to find the maximum satisfying assignment of the Boolean formula, hence the minimum of the cost function in terms of the values of the binary variables.

In some embodiments, the method further comprises providing at least one command to or actuating an apparatus or system for configuration thereof, the at least one command or actuation being based on the values of the two or more binary variables found.

The apparatus or system, or a process in which said apparatus or system is involved, has an operation or evolution characterizable by the optimization problem. Upon finding the solution to the optimization problem, the operation of the apparatus or system or the evolution of the process can be adjusted by commanding or actuating said apparatus or system in accordance with the values of the binary values, thereby enhancing the operation or the process and attaining one or more of e.g. reduction in energy consumption, reduction in operational costs, reduction in noise, increase in production quantities, increase in quality of produced goods, among other.

It is also possible to provide the apparatus, system or process with closed-loop feedback, in this way after actuating or issuing the at least one command, a new optimization problem can be obtained or the same optimization problem maintained but with more recent data of the apparatus, system or process—e.g. sensor data, information introduced by users indicative of the operation, etc.—, and optimize the associated cost function to monitor the correct performance or perform subsequent actuation or issuance of commands. Therefore, the actuation or issuance of at least one command improves the respective operation or evolution.

In some cases, the apparatus, system or process can be part of a design or simulation procedure whereby the entity or process designed or simulated is influenced by the optimization problem. That is to say, the optimization problem may reflect the designing or simulating of the entity or process. Accordingly, the actuation or the at least one command based on the binary variables alter the entity or process under design or simulation and improve the result thereof.

In some embodiments, the two or more binary variables relate to one or more devices of the apparatus or system, and the at least one command is provided to or the actuation is made on one of the following: at least one device of said one or more devices, at least one device different from said one or more devices, and a combination thereof.

When the command is provided to or the actuation is made on at least one device different from said one or more devices, said at least one device is involved in a process in which the one or more devices are involved. For instance, the result in the process of the at least one device is to be processed by the one or more devices; by way of example, in a production line, the binary values may reveal that workpieces being processed by the one or more devices have been incorrectly processed in an earlier stage—including said at least one device different from the one or more devices—and, thus, the earlier stage needs to be adjusted. Or, for instance, the result in the process of the one or more devices is to be processed by said at least one device; by way of example, in a road leading to a road crossing, the binary values may reveal that few motor—including said at least one device different from the one or more devices—and, thus, the earlier stage needs to be adjusted In some embodiments, the step of obtaining the equation with the cost function further comprises processing the cost function equation so as to derive an integer programming formulation thereof if the cost function equation is not in an integer programming formulation.

The cost function equation for a QUBO is of the form $H=\Sigma_{<i,j>}Q_{ij}x_ix_j+\Sigma_i q_i x_i$, where $x_i$ and $x_j$ are the binary variables, and $Q_{ij}$ and $q_i$ are couplings of the respective binary variables $x_i$ and $x_j$. The cost function equation for a HUBO is of the form $H=\Sigma_{n,<i1, i2, \ldots, in>}Q_{i1\ i2\ \ldots\ in}x_{i1}x_{i2}\cdots x_{in}$, where $x_{i1}, x_{i2}, \ldots x_{in}$, are the binary variables, and $Q_{i1\ i2\ \ldots\ in}$ are couplings of the respective binary variables $x_{i1}\ x_{i2}, \ldots x_{in}$. The couplings $Q_{ij}$ and $q_i$ can be rational numbers, and when they are not integer numbers, the computing apparatus or system processes the cost function equation so as to provide the integer programming formulation in which the couplings are integers. The same applies to the couplings $Q_{i1\ i2\ \ldots\ in}$.

To this end, the cost function equation is multiplied—or divided—by a factor that converts the couplings in integers. The cost function equation can be multiplied by the factor $$\frac{1}{\varepsilon} = 10^\alpha,$$

with α e.g. taking a value corresponding to the precision digits of the couplings, e.g. $Q_{ij}$ and $q_i$, $Q_{i1\ i2\ \ldots\ in}$. By way of example, assume a QUBO with couplings $Q_{ij}$=0.02 and $q_i$=−0.05, the precision of the digits is two, thus alpha can take the value of 2, and the multiplication of the cost function equation by the factor $$\frac{1}{\varepsilon} = 10^2,$$

the couplings are converted into integers as follows:

$$R_{ij} = \frac{Q_{ij}}{\varepsilon} = 2, \text{ and } r_i = \frac{q_i}{\varepsilon} = -5.$$

In some embodiments, the integer programming formulation of the cost function equation is: $H|_I=\Sigma_{<i,j>}R_{ij}x_ix_j+\Sigma_i r_i x_i$, where $x_i$ and $x_j$ are the binary variables, $R_{ij}$ and $r_i$ are couplings of the respective binary variables $x_i$ and $x_j$.

When the cost function equation is e.g. multiplied by a factor $$\frac{1}{\varepsilon}$$

that makes the couplings thereof integers, the relationship of the cost function between the integer programming formulation and the original formulation is $$H|_I \equiv \frac{H}{\varepsilon},$$

yet the configuration that minimizes H likewise minimizes $H|_I$. This means that the solution to the optimization problem is not affected if the cost function equation has to be converted into the integer programming formulation.

In some embodiments, the converting step further comprises: converting the integer programming formulation of the cost function equation into a sums of terms formulation and converting the sums of terms formulation into the Boolean formula if the integer programming formulation of the cost function equation is not also in sums of terms formulation, and each sum of the sums of terms formulation has a prefactor of one.

The cost function in a sums of terms formulation can take the following form, for example: $H|_S=\Sigma_{<i,j>}\Sigma_{p=1}^{R_{ij}}x_ix_j+\Sigma_i\Sigma_{p=1}^{r_i}x_i$. The couplings $R_{ij}$ and $r_i$ are the same ones of the cost function equation in the integer programming formulation, either after conversion of the equation into the integer programming formulation as explained above, or the original ones of the cost function equation if already in the integer programming formulation referred to above as couplings $Q_{ij}$ and $q_i$. The sums with prefactors of one ease the conversion of the cost function equation into the Boolean formula.

In some embodiments, the Boolean formula is: $\emptyset=\Lambda_{b=1}^{m_2} C_b^{(2)} \Lambda_{a=1}^{m_1} C_a^{(1)}$, where $C_b^{(2)}$ and $C_a^{(1)}$ are two- and one-binary clauses, respectively, and $m_2$ and $m_1$ are total numbers of the two- and one-binary clauses, respectively.

In this sense, $m_2 = 2\sum_{<i,j>}\sum_{p=1}^{R_{ij}} 1$, and $m_1 = \sum_i \sum_{p=1}^{r_i} 1$, with the factor 2 in $m_2$ taking into account that for every variable-variable interaction term in the cost function there are two clauses in the Boolean formula; although the couplings $R_{ij}$ and $r_i$ are referred to in these formulas, it is readily apparent that the couplings $Q_{ij}$ and $q_i$ are used when the cost function equation is already in the integer programming formulation and, thus, no conversion into the integer programming formulation is necessary. It is noted that the total number of clauses is $m_{tot} = m_2 + m_1$, which depends on the number of binary variables in the cost function and the couplings in integer form, i.e. both $Q_{ij}$ and $q_i$, or both $R_{ij}$ and $r_i$. It is also noted that the $\Lambda$ operator corresponds to a logical AND function.

The binary clauses are established in accordance with the cost function equation in sums of terms formulation in which each sum has a prefactor of one.

In some embodiments, the Max-Clique problem obtained comprises construction of a graph with cliques of a given size k and in one-to-one correspondence to assignments of the Boolean formula satisfying k clauses of the Boolean formula. The optimal solution for an input instance has the maximum achievable k for that instance.

The graph is constructed such that every literal corresponds to a node thereof. The nodes of the graph are thus defined by the literals of the Boolean formula. Then, all nodes of the graph that satisfy the following criteria are connected by an edge: (i) the two nodes do not correspond to variables in a same clause, and (ii) the two nodes do not correspond to complementary binary variables—i.e. $x_i$ and $\bar{x}_i$—in the Boolean formula.

In some embodiments, the light output data is processed to find a maximum-size clique of a graph of the Max-Clique problem, and processing the maximum-size clique in order to find the values of the two or more binary variables of the cost function.

The distribution of photons in the light output by the quantum device makes possible to identify dense subgraphs in the graph of the Max-Clique problem, thus upon processing said light output data the subgraphs can be provided. The processing of the subgraphs results in the finding of cliques, which in turn have the values of the binary variables that maximize the Boolean formula and that, hence, minimize the cost function, thereby solving the QUBO.

In some embodiments, the step of obtaining the equation with the cost function further comprises defining the cost equation upon processing data relative of an apparatus, system or process related to the optimization problem.

The cost function can be defined on-the-fly based on data provided by the apparatus, system or process, in this way the optimization in the configuration thereof can be dynamically set or adjusted, thereby improving the operation or evolution of the apparatus, system or process.

In some embodiments, the step of obtaining the equation with the cost function further comprises digitizing one or more continuous variables into one or more of the two or more binary variables with the following equation: $p_s = \sum_{\alpha=0}^{m-1} 2^\alpha x_{s,\alpha}$, where $p_s$ is the respective continuous variable, m is the respective number of bits for the digitization, and $x_{s,\alpha}$ is the respective one or more binary variables.

In some embodiments, the step of processing the light output data further comprises estimating values of the one or more continuous variables with the values of the one or more of the two or more binary variables.

When the cost function includes one or more binary variables resulting from the digitizing of the one or more continuous variables, the value(s) of the latter can be estimated upon solving the optimization problem for more precise optimization thereof.

In some embodiments, the step of obtaining the equation with the cost function further comprises processing the cost function to reduce the polynomials of the one or more binary variables to quadratic terms.

This may be carried out by e.g. adding ancillas to the cost function as known in the art, for example as described in N. Chancellor, S. Zohren, P. A. Warburton, npj Quantum Information 3 (2017), 10.1038/s41534-017-0022-6, which is hereby incorporated by reference in its entirety.

In some embodiments, the method further comprises codifying the Max-Clique problem in the GBS quantum device.

The Max-Clique problem is converted into quantum state of light that the GBS quantum device receives as input for solving the problem.

A second aspect of the invention relates to a data processing apparatus or data processing system comprising means for carrying out the steps of a method according to the first aspect of the invention.

In some embodiments, the data processing apparatus or the data processing system further comprises the GBS quantum device communicatively coupled with the means and adapted for carrying out the step of codifying the Max-Clique problem of the first aspect of the invention.

A third aspect of the invention relates to an apparatus comprising: at least one processor, and at least one memory comprising computer program code for one or more programs; the at least one processor, the at least one memory, and the computer program code configured to cause the apparatus to at least carry out the steps of a method according to the first aspect of the invention, i.e.: obtain an equation with a cost function for minimization related to an optimization problem thereby yielding a cost function equation, the cost function including two or more binary variables; convert an integer programming formulation of the cost function equation into a Boolean formula in Conjunctive Normal Form comprising a clause for each term of the cost function that includes at least one binary variable; obtain a Max-Clique problem by processing the Boolean formula; providing the Max-Clique problem to a Gaussian Boson Sampling, GBS, quantum device; and process light output data or receive processed output data of the GBS quantum device after the step of providing the Max-Clique problem so as to find values of the two or more binary variables of the cost function.

In some embodiments, the at least one processor, the at least one memory, and the computer program code may also be configured to cause the apparatus to carry out the steps of the different embodiments of the method described in the first aspect of the invention.

A fourth aspect of the invention relates to a computer program product comprising instructions which, when the program is executed by a computer, cause the computer to carry out the steps of a method according to the first aspect of the invention.

A fifth aspect of the invention relates to a non-transitory computer-readable medium encoded with instructions that, when executed by at least one processor or hardware, perform or make an apparatus to perform the steps of a method according to the first aspect of the invention.

A sixth aspect of the invention relates to a computer-readable data carrier having stored thereon a computer program product according to the fourth aspect of the invention.

A seventh aspect of the invention relates to a data carrier signal carrying a computer program product according to the fourth aspect of the invention.

Similar advantages as those described with respect to the first aspect invention may also apply to the remaining aspects of the invention.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DESCRIPTION OF WAYS OF CARRYING OUT THE INVENTION

Figure 1:
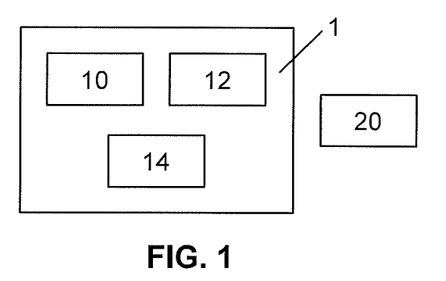
FIG. 1 diagrammatically shows apparatuses or systems in accordance with embodiments.

FIG. 1 diagrammatically shows apparatuses or systems 1 in accordance with embodiments.

Methods according to the present disclosure can be carried out by computing apparatuses or computing systems 1, also referred to herein as data processing apparatuses or systems. As known in the art, computing systems include two or more computing apparatuses communicatively coupled and one or more steps, or at least parts thereof, of a method are executed by one or more computing apparatuses, and other parts or other one or more other steps of the method are executed by one or more other computing apparatuses.

The apparatus or system 1 comprise at least one processor 10 and at least one memory 12. The at least one memory 12 may include instructions, for example in the form of a computer program code, so that upon execution by the at least one processor 10 a method according to the present disclosure is carried out. The apparatus or system 1 further comprise a communications module 14 for establishing communications with a photonic quantum device 20 based on Gaussian Boson Sampling.

The communications module 14 may include a converter of electrical signals into light and vice versa, even though the quantum device 20 could be provided with such a converter, or an external converter could be arranged between the communications module 14 and the quantum device 20.

Figure 2:
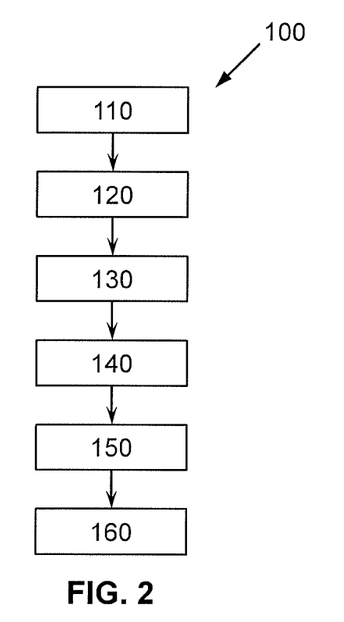
FIG. 2 diagrammatically show a method in accordance with embodiments.

FIG. 2 diagrammatically shows a method 100 in accordance with embodiments.

The method 100, which is carried out by a computing apparatus or system such as the one described with reference to FIG. 1, comprises a step of obtaining 110 an equation with a cost function for minimization thereof that includes a plurality of binary variables; in some embodiments, the plurality of binary variables comprises two binary variables whilst, in some other embodiments, the plurality comprises three binary variables, four binary variables or more than four binary variables. The cost function is part of an optimization problem that can relate to a process, an apparatus and/or a system. For example, the operation of the apparatus and/or the system is to be optimized, or the process or a part thereof is to be optimized, etc. The cost function sets out a UBO problem to be solved, which in some embodiments will be a QUBO whereas in other embodiments will be a HUBO problem.

The cost function, H, is in (sing model form, namely:

$$H = \sum_{\langle i,j \rangle} Q_{ij} x_i x_j + \sum_i q_i x_i$$

with $x_i$ and $x_j$ being the binary variables, and $Q_{ij}$ and $q_i$ being couplings of the respective binary variables $x_i$ and $x_j$. This cost function is equivalent to that of a magnetic system defined by a 2-body Hamiltonian of n classical lsing spins $s_i = \pm 1$ and $s_j = \pm 1$ at sites i and j, with spin-spin interactions and local magnetic fields as:

$$H_{mag} = \sum_{\langle i,j \rangle} J_{ij} s_i s_j + \sum_i h_i s_i$$

with $J_{ij}$ being the couplings and $h_i$ being the local magnetic fields. Finding the ground state of the above Hamiltonian is equivalent to a QUBO problem with mappings $$x_i = \frac{1 - s_i}{2} \text{ and } x_j = \frac{1 - s_j}{2},$$

with binary variables $x_i$ and $x_j$ taking values of 0 and 1.

An example of application of such optimization is that of investments in a portfolio at different time periods, where the cost function is $$H_{port} = \sum_t -\mu_t^T w_t + \frac{\gamma}{2} w_t^T \Sigma_t w_t + \lambda (\Delta w_t)^2$$

with $w_t$ the vector of investment percentages of the assets at time t, $\mu_t$ the expected returns, $\Sigma_t$ the covariance matrix, y the risk aversion, A the percentage of transaction costs, and $\Delta w_t$ the change in the composition of the portfolio at between two consecutive time steps. This cost function is exactly a QUBO when one decomposes the coefficients of vector $w_t$ in terms of individual bits. Another example is that of vehicle routing, where one has to design routes from depots to a number of client locations and back to the depot, so as to minimize the travelled miles. The cost function here is that of the traveling salesman problem—i.e. TSP—, which is $$H_{vehic} = \sum_{(uv)} W_{uv} \sum_j x_{uj} x_{vj+1}$$

with $W_{uv}$ the distance between client locations u and v, $x_{uj}=1$ if client u is visited at step j and =0 otherwise, and where the constraints specific to the particular instance of the problem can be added using Lagrange multipliers.

Finally, another example is that of a machine learning classification algorithm based on a Support Vector Machine. In this case the cost function is $$H_{SVM} = \frac{1}{2}\sum_{nm} \alpha_n \alpha_m t_n t_m k(x_n, x_m) - \sum_n \alpha_n$$

with $t_n=\pm 1$ for a binary classification—more values for more general classifiers—, $k(x_n,x_m)$ is the SVM kernel evaluated at datapoints $(x_n, x_m)$ of a training set, and $\alpha_n$ are continuous variables to optimize. Once these variables are discretized in terms of binary variables, the SVM training is again a QUBO problem.

The method 100 comprises a subsequent step of converting 120 an integer programming formulation of the cost function equation obtained 110 into a Boolean formula. The Boolean formula is to be defined in Conjunctive Normal Form such that it comprises a clause for each term of the cost function that includes at least one binary variable.

In some cases, the cost function equation obtained 110 is already in integer programming formulation, i.e. $H|_I = H$, whereas in some other cases the cost function equation is first to be converted into the integer programming formulation by multiplying—or dividing—the equation by a factor, i.e.

$$H|_I \equiv \frac{H}{\varepsilon}.$$

There is one clause of the Boolean formula 0 for every term in H or $H|_I$ such that the clause is satisfied—i.e. the clause equals 1—only for minimizing configurations of the term in the cost function. In a QUBO problem, the clauses can be as follows:
1. Term $-x_i \leftrightarrow$ Clause $(x_i)$
2. Term $+x_i \leftrightarrow$ Clause $(\bar{x}_i)$
3. Term $+x_i x_j \leftrightarrow$ Clause $(\bar{x}_i \vee \bar{x}_j)$
4. Term $-x_i x_j \leftrightarrow$ Clause $(x_i \vee \bar{x}_j)$ It is noted that the $\vee$ operator corresponds to a logical OR function, $\bar{x}_i$ is the negation of $x_i$. As aforementioned, clauses are satisfied when the assignment of binary variables makes them equal to one. The choice of the clauses is such that they are satisfied whenever the corresponding cost function term is in one of its minimizing configurations. The mapping is therefore one-to-one and generalizable beyond two variable interactions, thereby making possible to arrive at Boolean formulas for HUBO problems.

The Boolean formula can take the following form:

$$\phi = \bigwedge_{b=1}^{m_2} C_b^{(2)} \bigwedge_{a=1}^{m_1} C_a^{(1)}$$

with $C_b^{(2)}$ and $C_a^{(1)}$ being two- and one-binary clauses, respectively, and $m_2$ and $m_1$ being total numbers of the two- and one-binary clauses, respectively.

The definition of the Boolean formula is such that assignments that maximally satisfy it in turn minimize the cost function. This means that the original optimization problem whereby the cost function is obtained 110 is mapped to the problem of finding a maximum satisfying assignment of the Boolean formula.

For QUBO, the maximum satisfying assignment encompasses clauses involving at most two binary variables. In other words, the original optimization problem corresponding to QUBO is mapped to the Max 2-SAT problem. For HUBO, the original optimization problem is mapped to the Max k-SAT problem. While the 2-SAT and k-SAT problems are in the complexity class P—implying that there is a polynomial-time algorithm for deciding whether a Boolean formula in CNF with clauses involving at most 2 bits is satisfiable or not—, the Max 2-SAT and Max k-SAT problems are in NP-Complete—implying that there is no known polynomial-time algorithm to find the maximum number of clauses that can be simultaneously satisfied for such a Boolean formula.

The method 100 comprises a subsequent step of processing the Boolean formula above so as to obtain 130 a Max-Clique problem. Therefore, the Max 2-SAT problem or the Max k-SAT problem is reduced to the Max-Clique problem, which entails finding a maximum-size clique of an undirected graph. A graph can be constructed such that cliques of a given size k are in one-to-one correspondence to assignments of the Boolean formula in CNF satisfying k clauses.

The method 100 comprises a subsequent step of providing 140 the Max-Clique problem obtained 130 to a Gaussian Boson Sampling, GBS, quantum device like the quantum device described with reference to FIG. 1. The GBS quantum device is to provide a distribution of light corresponding to the dense subgraphs in a graph of the Max-Clique problem.

The method 100 comprises a subsequent step of processing 150 the output of the GBS quantum device after the provision 140 of the Max-Clique problem. By processing 150 said output, and taking into account the sequence of steps of the method, it is possible to find the values of the binary variables of the cost function, that is to say, the configuration(s) that minimize the cost function.

The method 100 comprises a subsequent step of processing providing 160 at least one command to or actuating 160 an apparatus or system for configuration thereof based on the values of the two or more binary variables found upon processing 150 the output of the quantum device. In some embodiments, the at least one command or actuation 160 can be causing the display of the values of the two or more binary variables for informing about the process, apparatus or system characterized by the optimization problem. By way of example, said values can be indicative of proportions of constituents of a compound to be produced or of the elements in a chemical reaction.

Figure 3:
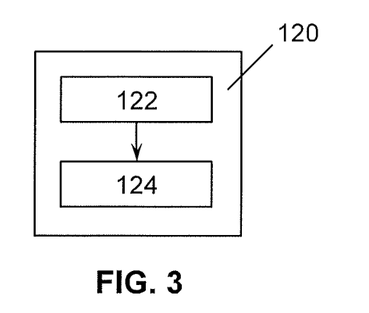
FIGS. 3 and 4 diagrammatically shows possible additional steps of methods in accordance with embodiments.

FIG. 3 diagrammatically shows possible additional steps of methods in accordance with embodiments, for example but without limitation, methods 100 as described with reference to FIG. 2. The additional steps 122, 124 are comprised in the step of converting 120 the integer programming formulation of the cost function equation into the Boolean formula.

Said conversion 120 step includes a step of converting 122 the integer programming formulation of the cost function equation into a sums of terms formulation, and subsequently converting 124 the sums of terms formulation into the Boolean formula. The sums of terms formulation is such that each sum has a prefactor of one.

It is preferable to convert the integer programming formulation of the cost function equation into the Boolean formula with the cost function equation also being in a sums of terms formulation with each sum having prefactor of one. This eases the conversion into the Boolean formula since there is a clause for each term of the sums of terms formulation of the cost function equation. In some embodiments, the integer programming formulation of the cost function equation is already in a sums of terms formulation with prefactors of one, whereas in some other cases the cost function equation is converted into the sums of terms formulation by rewriting the equation in integer programming formulation. Accordingly, these conversion steps 122, 124 preferably take place in these latter cases, which is when the integer programming formulation of the cost function equation is not also in sums of terms formulation.

A cost function in both integer programming and sums of terms formulations is of the form:

$$H|_S = \sum_{\langle i,j \rangle} \sum_{p=1}^{Q_{ij}} x_i x_j + \sum_i \sum_{p=1}^{q_i} x_i$$

with $x_i$ and $x_j$ being the binary variables, and $Q_{ij}$ and $q_i$ being couplings of the respective binary variables $x_i$ and $x_j$ as integers.

Figure 4:
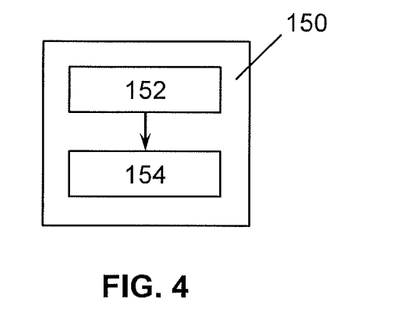

FIG. 4 diagrammatically shows possible additional steps of methods in accordance with embodiments, for example but without limitation, methods 100 as described with reference to FIG. 2. The additional steps 152, 152 are comprised in the step of processing 150 the output of the GBS quantum device.

Said processing 150 step includes a step of finding 152 a maximum-size clique of a graph of the Max-Clique problem, and subsequently converting processing 154 the maximum-size clique(s) found 152 in order to find the values of the plurality of binary variables of the cost function. The finding 152 of the maximum-size clique can be attained in different ways, for example in some embodiments that it attained by way of classical random search as known in the art, for example as explained in Secs. III.B and III.C of L. Banchi, M. Fingerhuth, T. Babej, J. M. Arrazola, et al., arXiv preprint arXiv:1902.00462(2019), said sections and document being hereby incorporated in their entirety.

Figure 5:
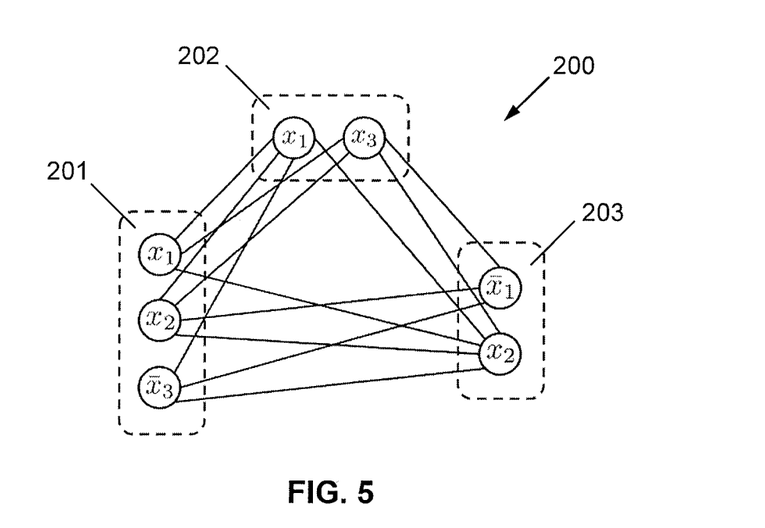
FIG. 5 diagrammatically shows an exemplary graph corresponding to an exemplary Boolean formula in CNF for the definition of the Max-Clique problem.

FIG. 5 diagrammatically shows an exemplary graph 200 corresponding to an exemplary Boolean formula in CNF for the definition of the Max-Clique problem.

The graph of a Max-Clique problem is to be constructed such that every literal corresponds to a node thereof. The nodes of the graph 200 are thus defined by the literals of a Boolean formula obtained from the cost function equation, and all nodes of the graph 200 that satisfy the following criteria are to be connected by an edge: (i) the two nodes do not correspond to variables in a same clause, and (ii) the two nodes do not correspond to complementary binary variables—i.e. $x_i$ and $\bar{x}_i$—in the Boolean formula.

The graph 200 has been represented for the following exemplary Boolean formula: $\emptyset(x_1,x_2,x_3)=(x_1 \vee x_2 \vee \bar{x}_3) \wedge (x_1 \vee x_3) \wedge (\bar{x}_1 \vee x_2)$. The graph 200 thus includes first, second and third clauses 201-203.

From the above Boolean formula and the graph 200 it can be appreciated that there is an assignment of the binary variables satisfying k clauses of the Boolean formula if and only if the graph has a clique of size k. This is apparent from the following:

it is assumed that k clauses are satisfied in the formula. For each one of those clauses, at least one binary variable is 1, thus a corresponding node in the graph 200 is selected; if more than one binary variable is 1 for a given clause, only one of them is selected. All the selected nodes form a clique of size k because (i) they all belong to different clauses, and (ii) they are all joined by an edge. Thus, graph 200 contains a clique of size k; and if the graph 200 has a clique of size k, then this involves k clauses because nodes corresponding to the same clause are not connected in the graph 200. Assigning a value of 1 to the corresponding variables produces by construction a binary string that satisfies the k clauses in the Boolean formula.

In this text, the term "comprises" and its derivations such as "comprising", etc. should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art—for example, as regards the choice of materials, dimensions, components, configuration, etc.—, within the general scope of the invention as defined in the claims.

The invention claimed is:

1. A method comprising:
    obtaining, by a computing apparatus or a computing system, an equation with a cost function for minimization related to an optimization problem thereby yielding a cost function equation, the cost function including two or more binary variables;
    converting, by the computing apparatus or the computing system, an integer programming formulation of the cost function equation into a Boolean formula in Conjunctive Normal Form comprising a clause for each term of the cost function that includes at least one binary variable;
    obtaining, by the computing apparatus or the computing system, a Max-Clique problem by processing the Boolean formula;
    providing, from the computing apparatus or the computing system, the Max-Clique problem to a Gaussian Boson Sampling, GBS, quantum device by converting the Max-Clique problem into quantum state of light received as input by the GBS quantum device;
    outputting, by the GBS quantum device, light resulting from the quantum state of light received as input by the GBS quantum device, the light output having a distribution corresponding to dense subgraphs in a graph of the Max-Clique problem;
    transforming the light output into light output data; and
    processing, by the computing apparatus or the computing system, the light output data by finding one or more cliques of the subgraphs so as to find values of the two or more binary variables of the cost function; the one or more cliques having the values of the two or more binary variables of the cost function.

2. The method of claim 1, further comprising providing, by the computing apparatus or the computing system, at least one command to or actuating, by the computing apparatus or the computing system, an apparatus or system for configuration thereof, the at least one command or actuation being based on the values of the two or more binary variables found.

3. The method of claim 2, wherein the two or more binary variables relate to one or more devices of the apparatus or system receiving the at least one command or being actuated, and wherein the at least one command is provided to or the actuation is made on one of the following: at least one device of said one or more devices, at least one device different from said one or more devices, and a combination thereof.

4. The method of claim 1, wherein the step of obtaining the equation with the cost function further comprises processing, by the computing apparatus or the computing system, the cost function equation so as to derive the integer programming formulation thereof if the cost function equation is not in the integer programming formulation.

5. The method of claim 1, wherein the integer programming formulation of the cost function equation is: $H=\Sigma_{<i, j>} R_{ij} x_i x_j + \Sigma_i r_i x_i$, where $x_i$ and $x_j$ are the binary variables, $R_{ij}$ and $r_i$ are couplings of the respective binary variables $x_i$ and $x_j$.

6. The method of claim 1, wherein the converting step further comprises: converting, by the computing apparatus or the computing system, the integer programming formulation of the cost function equation into a sums of terms formulation and converting, by the computing apparatus or the computing system, the sums of terms formulation into the Boolean formula if the integer programming formulation of the cost function equation is not also in sums of terms formulation, and wherein each sum of the sums of terms formulation has a prefactor of one.

7. The method of claim 1, wherein the Boolean formula is: $\emptyset = \Lambda_{b=1}^{m_2} C_b^{(2)} \Lambda_{a=1}^{m_1} C_a^{(1)}$, where $C_b^{(2)}$ and $C_a^{(1)}$ are two- and one-binary clauses, respectively, and $m_2$ and $m_1$ are total numbers of the two- and one-binary clauses, respectively.

8. The method of claim 1, wherein the Max-Clique problem obtained comprises construction of a graph with cliques of a given size k and in one-to-one correspondence to assignments of the Boolean formula satisfying k clauses of the Boolean formula.

9. The method of claim 1, wherein the light output data is processed, by the computing apparatus or the computing system, to find a maximum-size clique of a graph of the Max-Clique problem, and the method comprises processing (154), by the computing apparatus or the computing system, the maximum-size clique in order to find the values of the two or more binary variables of the cost function.

10. The method of claim 1, wherein the step of obtaining the equation with the cost function further comprises at least one of:
digitizing, by the computing apparatus or the computing system, one or more continuous variables into one or more of the two or more binary variables with the following equation: $p_s = \Sigma_{\alpha=0}^{m-1} 2^\alpha x_{s,\alpha}$, where $p_s$ is the respective continuous variable, m is the respective number of bits for the digitization, and $x_{s,\alpha}$ is the respective one or more binary variables; and
processing, by the computing apparatus or the computing system, the cost function to reduce the polynomials of the one or more binary variables to quadratic terms.

11. The method of claim 1, wherein the optimization problem relates to an optimization problem for one of: control of a factory, control of a production line, control of a machine, control of logistics, control of scheduling, routing, portfolio optimization, financial equilibrium, training of a machine learning algorithm, and factoring large numbers.

12. A system comprising:
a Gaussian Boson Sampling, GBS, quantum device, and an apparatus comprising:
at least one processor;
at least one memory comprising computer program code for one or more programs;
the at least one processor, the at least one memory, and the computer program code configured to cause the apparatus to at least carry out the following:
obtaining an equation with a cost function for minimization related to an optimization problem thereby yielding a cost function equation, the cost function including two or more binary variables;
converting an integer programming formulation of the cost function equation into a Boolean formula in Conjunctive Normal Form comprising a clause for each term of the cost function that includes at least one binary variable;
obtaining a Max-Clique problem by processing the Boolean formula; and
providing the Max-Clique problem to a Gaussian Boson Sampling, GBS, quantum device;
the GBS quantum device being configured to:
receive, as input, quantum state of light resulting from conversion of the Max-Clique problem into quantum state of light; and
output light resulting from the quantum state of light received as input by the GBS quantum device, the light output having a distribution corresponding to dense subgraphs in a graph of the Max-Clique problem; and
the at least one processor, the at least one memory, and the computer program code configured to cause the apparatus to at least carry out the following:
receiving light output data resulting from transformation of the light output into light output data; and
processing the light output data by finding one or more cliques of the subgraphs so as to find values of the two or more binary variables of the cost function; the one or more cliques having the values of the two or more binary variables of the cost function.

13. The tem of claim 12, wherein the at least one processor, the at least one memory, and the computer program code are configured to cause the apparatus to further carry out: providing at least one command to or actuating an apparatus or system for configuration thereof, the at least one command or actuation being based on the values of the two or more binary variables found.

14. The system of claim 12, wherein the at least one processor, the at least one memory, and the computer program code are configured to cause the apparatus to further carry out: processing the cost function equation so as to derive the integer programming formulation thereof if the cost function equation is not in the integer programming formulation.

15. The system of claim 12, wherein the integer programming formulation of the cost function equation is: $H=\Sigma_{<i, j>} R_{ij} x_i x_j + \Sigma_i r_i x_i$, where $x_i$ and $x_j$ are the binary variables, $R_{ij}$ and $r_i$ are couplings of the respective binary variables $x_i$ and $x_j$.

16. The system of claim 12, wherein the at least one processor, the at least one memory, and the computer program code are configured to cause the apparatus to carry out the conversion by further: converting the integer programming formulation of the cost function equation into a sums of terms formulation and converting the sums of terms formulation into the Boolean formula if the integer programming formulation of the cost function equation is not also in sums of terms formulation, and wherein each sum of the sums of terms formulation has a prefactor of one.

17. The system of claim 12, wherein the Boolean formula is: $\emptyset = \Lambda_{b=1}^{m_2} C_b^{(2)} \Lambda_{a=1}^{m_1} C_a^{(1)}$, where $C_b^{(2)}$ and $C_a^{(1)}$ are two- and one-binary clauses, respectively, and $m_2$ and $m_1$ are total numbers of the two- and one-binary clauses, respectively.

18. The system of claim 12, wherein the optimization problem relates to an optimization problem for one of: control of a factory, control of a production line, control of a machine, control of logistics, control of scheduling, routing, portfolio optimization, financial equilibrium, training of a machine learning algorithm, and factoring large numbers.

19. A system comprising:
a Gaussian Boson Sampling, GBS, quantum device, and
a non-transitory computer-readable medium encoded with instructions that, when executed by at least one processor or hardware, make an apparatus to at least perform the following:
obtaining an equation with a cost function for minimization related to an optimization problem thereby yielding a cost function equation, the cost function including two or more binary variables;
converting an integer programming formulation of the cost function equation into a Boolean formula in Conjunctive Normal Form comprising a clause for each term of the cost function that includes at least one binary variable;
obtaining a Max-Clique problem by processing the Boolean formula; and
providing the Max-Clique problem to a Gaussian Boson Sampling, GBS, quantum device;
the GBS quantum device being configured to:
receive, as input, quantum state of light resulting from conversion of the Max-Clique problem into quantum state of light; and
output light resulting from the quantum state of light received as input by the GBS quantum device, the light output having a distribution corresponding to dense subgraphs in a graph of the Max-Clique problem; and
the non-transitory computer-readable medium being encoded with instructions that, when executed by at least one processor or hardware, make an apparatus to at least perform the following:
receiving light output data, the light output data resulting from transformation of the light output by the GBS quantum device into light output data; and
processing the light output data by finding one or more cliques of the subgraphs so as to find values of the two or more binary variables of the cost function; the one or more cliques having the values of the two or more binary variables of the cost function.

* * * * *